US009792788B2

(12) United States Patent
Joseph et al.

(10) Patent No.: US 9,792,788 B2
(45) Date of Patent: Oct. 17, 2017

(54) INDIVIDUAL EVACUATION PLAN GENERATION AND NOTIFICATION VIA SMART/WEARABLE DEVICES BY POSITIONING AND PREDICTING EMERGENCIES INSIDE A BUILDING

(71) Applicant: Honeywell International Inc., Morristown, NJ (US)

(72) Inventors: Vibgy Joseph, Tirunelveli (IN); Sakthi Prakash Marakkannu, Madurai (IN); Balaji Bhathey Sivakumar, Madurai (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 234 days.

(21) Appl. No.: 14/810,030

(22) Filed: Jul. 27, 2015

(65) Prior Publication Data
US 2017/0032632 A1 Feb. 2, 2017

(51) Int. Cl.
*G08B 7/06* (2006.01)
(52) U.S. Cl.
CPC .................... *G08B 7/066* (2013.01)
(58) Field of Classification Search
None
See application file for complete search history.

(56) References Cited

U.S. PATENT DOCUMENTS

| 7,393,121 B2 | 7/2008 | Small |
| 7,924,149 B2 | 4/2011 | Mendelson |
| 8,538,687 B2 | 9/2013 | Plocher et al. |
| 8,723,666 B2 | 5/2014 | Edwards |
| 2004/0153334 A1 | 8/2004 | Dione |
| 2011/0136463 A1* | 6/2011 | Ebdon .............. G01C 21/20 455/404.1 |
| 2013/0099919 A1* | 4/2013 | Cai ................ G01S 5/0009 340/539.13 |

(Continued)

FOREIGN PATENT DOCUMENTS

| EP | 2 597 423 A1 | 5/2013 |
| WO | WO 2006/096431 A2 | 9/2006 |

OTHER PUBLICATIONS

Extended European search report for corresponding EP patent application 16180248.3 dated Nov. 21, 2016.

*Primary Examiner* — Laura Nguyen
(74) *Attorney, Agent, or Firm* — Husch Blackwell LLP

(57) ABSTRACT

A system is provided that includes a threat detection system having a plurality of threat sensors, a building information model (BIM) of a secured area embodied in memory, an access control system that detects entry by human occupants into the secured area and that provides an overall indication of location of each of the human occupants, an occupant locator and notifier that detects a specific location of human occupants within the secured area via radio waves emitted by a wireless device carried by each of the human occupants, and a safe path calculator that calculates a respective route to a safe exit for each of the human occupants based upon the BIM, a threat, the location of the threat, and the specific or overall indicated location of the human occupant, wherein the occupant location and notifier wirelessly sends the respective calculated route to the wireless device of the human occupant.

18 Claims, 3 Drawing Sheets

(56) References Cited

U.S. PATENT DOCUMENTS

| | | | |
|---|---|---|---|
| 2014/0222329 A1* | 8/2014 | Frey | G08B 7/066 701/423 |
| 2014/0253326 A1* | 9/2014 | Cho | H04W 4/22 340/539.13 |
| 2014/0320282 A1* | 10/2014 | Zhang | G08B 7/066 340/502 |

* cited by examiner

INDIVIDUAL EVACUATION PLAN GENERATION AND NOTIFICATION VIA SMART/WEARABLE DEVICES BY POSITIONING AND PREDICTING EMERGENCIES INSIDE A BUILDING

FIELD

This application relates to security systems and, more particularly, to systems for evacuating people from secured areas.

BACKGROUND

Systems are known to protect people and assets within secured areas. Such systems are typically based upon the use of one or more wireless sensors that detect threats within the secured areas.

Threats to people and assets may originate from any of a number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within an area. Intruders have also been known to injure or kill people living within the area.

In the case of intruders, sensors may be placed in different areas based upon the respective uses of those areas. For example, if people are present during some portions of a normal day and not at other times, then sensors may be placed along a periphery of a space to provide protection while the space is occupied, and additional sensors may be placed within an interior of the space and used when the space is not occupied.

In most cases, threat detectors are connected to a local control panel. In the event of a threat detected via one of the detectors, the control panel may sound a local audible alarm. The control panel may also send a signal to a central monitoring station.

While conventional security systems work well, it is sometimes difficult to protect occupants in response to detected threats. Accordingly, a need exists for better methods and an apparatus for routing occupants to exits.

DETAILED DESCRIPTION

Figure 1:
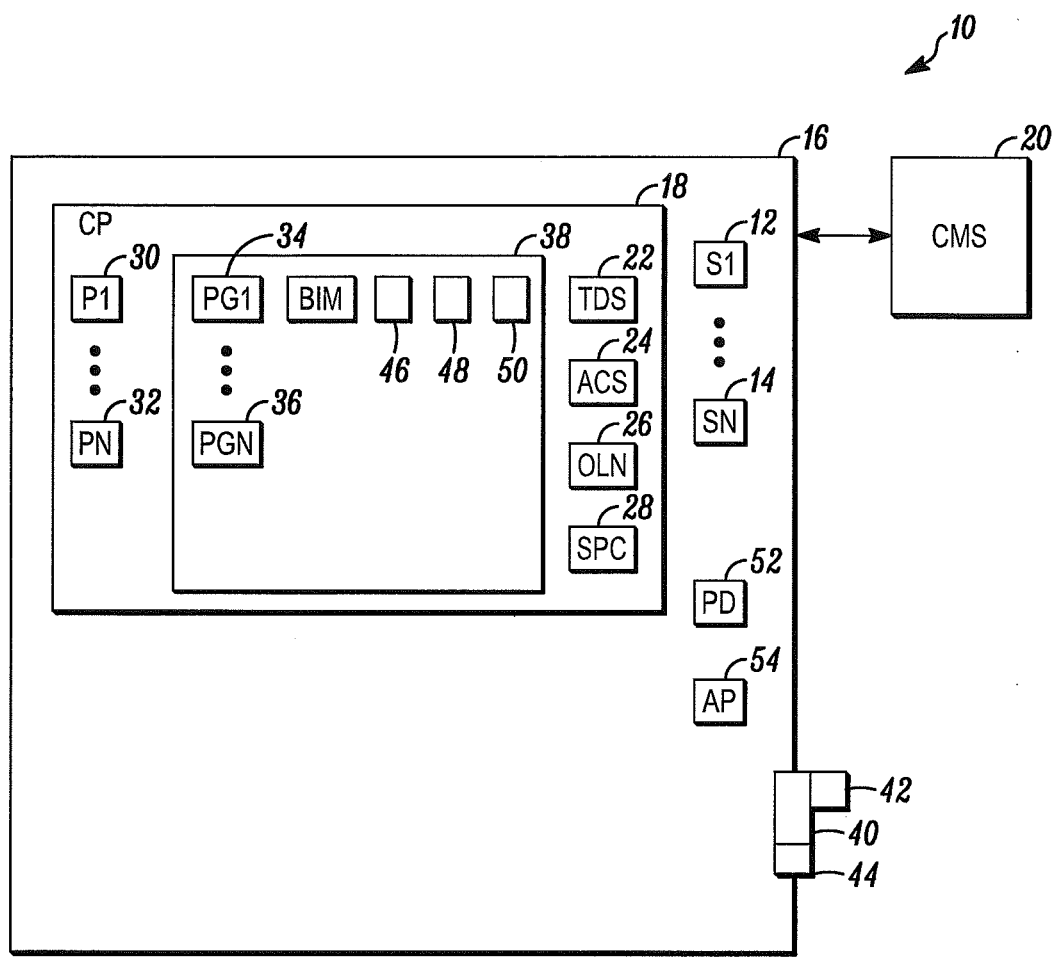
FIG. 1 illustrates a block diagram of a security system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 depicts a security system 10 shown generally in accordance with an illustrated embodiment. Included within the system are a number of sensors 12, 14 that detect threats within a secured geographic area (e.g., a building) 16. The sensors may be embodied under any of a number of different formats. For example, at least some of the sensors may be intrusion sensors. In this case, the sensors may be provided as switches placed on windows and/or doors 40 surrounding the secured area. Other of the sensors may be embodied as passive infrared (PIR) detectors or cameras with motion detection capabilities.

Other of the sensors may be environmental sensors. For example, some of the sensors may be fire or toxic gas detectors. Other of the sensors may be seismic detectors that detect earthquakes.

The threat sensors may be monitored via a control panel 18. The control panel may be located within the secured area, as shown in FIG. 1, or located remotely. Upon detection of a threat by the control panel, an alarm message may be sent by the control panel to a central monitoring station 20. The central monitoring station may respond by sending the appropriate help (e.g., police, fire department, etc.), Included within the control panel may be a number of subsystems, including a threat detection system 22, an access control system 24, an occupant locator and notifier 26, and a safe path calculator 28. These subsystems cooperate to expedite safe evacuation of the secured area.

The subsystems may each include one or more processor apparatus (processors) 30, 32 each executing one or more computer programs 34, 36 loaded from a non-transitory computer readable medium (memory) 38. As used herein, reference to a step performed by a computer program is also reference to the processor that executed that step. For example, one or more threat processors of the threat detection system may monitor the sensors. Upon detecting the activation of one of the sensors, the processor may compose an alarm message that is sent to the central monitoring station. The message may include an identifier of the security system (e.g., an address, account number, etc.), an identifier of the activated sensor, an indicator of the type of sensor (e.g., fire, gas, etc.), a location of the sensor in the secured area (e.g., first floor, second floor, stairwell, etc.), and a time.

Similarly, the access control system may include one or more identity card or biometric readers 42 located on doors providing access into and egress from the secured area. An access processor may monitor the readers (e.g., a card reader) for an indicia of identity read from the access cards of authorized users. The access processor may compare identification information received from the card reader with the corresponding indicia of an authorized human retrieved from a respective set of files 46 saved in memory.

Upon matching an identifier read from an access card carried by a user with the corresponding identifier retrieved from memory, the access processor may activate an electric lock 44 opening the door that allows access into the secured area. The access processor may also save in a file 48 a geographic location of entry by the user into the secured area. Following entry, the geographic location of entry is an indicator of the geographic location of the user under the assumption that the user would enter the secured area nearest his/her place of work and would, therefore, remain closer to the point of entry than any other point of entry.

The occupant locator and notifier may also include a number of respective subsystems. For example, a locator processor may monitor a frequency spectrum for radio frequency (RF) messages from wireless portable devices 52 carried by authorized occupants of the secured area. The RF messages may be detected by a number of access points (WiFi routers) 54 operating under an IEEE802.11 format. In this regard, the locator processor may measure a signal strength of the message detected by each access point for a received signal strength indicator (RSSI) value. The specific location of the user within the secured area may then be determined by a triangulation processor using triangulation.

Another subsystem of the locator and notification subsystem is a notification system. In this regard, a notification processor may send an evacuation map 50 to each authorized human occupant of the secured area. The evacuation map may be based upon the indicated or specific location of the user.

The safe path calculator includes a routing processor that first determines a current location of the user and then the geographic destination location of the nearest exit from the secured area (as determined from information retrieved from a BIM). The location of the user is determined first on the specific location of the user (if available) and, if not available, then on the indicated location of the user.

The evacuation route determined by the routing processor is further modified by information from the BIM. In this regard, the routing processor determines the location of physical obstacles (e.g., walls, locked or high security areas, etc.) and adjusts the evacuation route accordingly.

The specific route chosen by the routing processor is further modified by a location and scope of a threat detected by the threat detection system. In the case of an intruder, the location of the threat is limited to the physical location (i.e., point location) of the intruder. In the case of an environmental threat, the threat (and location of the threat) is expanded to cover a geographic area based upon propagation of the threat. For example, a fire propagation processor may identify the geographic coordinates of a periphery of a fire based upon data from the threat sensors and expand the threat area based upon materials identified along the periphery of the fire area. For example, the propagation processor may identify flammable materials along the periphery of the fire via information retrieved from the BIM in order to create and expand a threat area using a threat propagation model. Similarly, the threat area of a gas leak may be expanded based upon air flow within the secured area (retrieved from the BIM).

The routing processor may adjust the evacuation route to arrive at a final evacuation route based upon various threat propagation models. In this regard, if an initial evacuation route crosses an area covered by the threat propagation model, then the routing processor determines another (relatively shortest) route to the nearest exit that avoids the anticipated threat suggested by the propagation model.

Upon arriving at an evacuation route, the routing processor superimposes the evacuation route over a map of the secured area for the benefit of each authorized user. That is, the routing processor determines a separate respective evacuation route for each authorized user based upon a current location of the user. Once determined, the evacuation routes are dynamically altered based upon local conditions encountered by the propagation model.

Once the respective routes are determined, the notification processor sends the respective evacuation routes to the portable devices of the respective users. The evacuation maps are immediately shown on a display of the portable device along with an alert identifying the threat and a suggestion that the user immediately proceed to the exit for his/her own safety.

In general, the system of FIG. 1 offers a number of advantages over prior systems. For example, during an emergency situation, such as a fire breaking out, conventional emergency evacuation plans lack the ability to adapt to the situation. For example, during a hostage situation, administrative personnel cannot use public address systems to guide people to safety. During a fire, there is a possibility that a fire exit may be blocked by the fire as people try to evacuate through the nearest exit. Rescue teams may not know how many people are trapped in a building. Rescue teams also may not know exactly where occupants are located inside the building. Building layouts may evolve over time to become more complicated. However, the legacy evacuation plans may be designed using old knowledge. Legacy evacuation plans, like floor plans, are often difficult to understand. Not all people can visualize the floor plan of a real building.

In certain emergency situations, people in one building should evacuate, but people in another building should stay inside. Current public address systems are not of sufficient sophistication to provide independent/dynamic warnings.

In the case of an armed man threatening the people in an area, a facility manager should guide occupants in other areas away from the zone in which the armed person is present and guide the rescue team towards the affected area. With current public address systems, it is not possible to individually contact each occupant without the knowledge of the intruder.

In emergency situations, the occupants may be widely dispersed throughout a very large premise. Based on the current location of an occupant, there may be multiple ways to exit a premises out of which only one is the quickest and safest. With existing systems, the occupants may not know the hazards along a particular route out of the premises and may accidentally bump into a fire/affected area.

Figure 2:
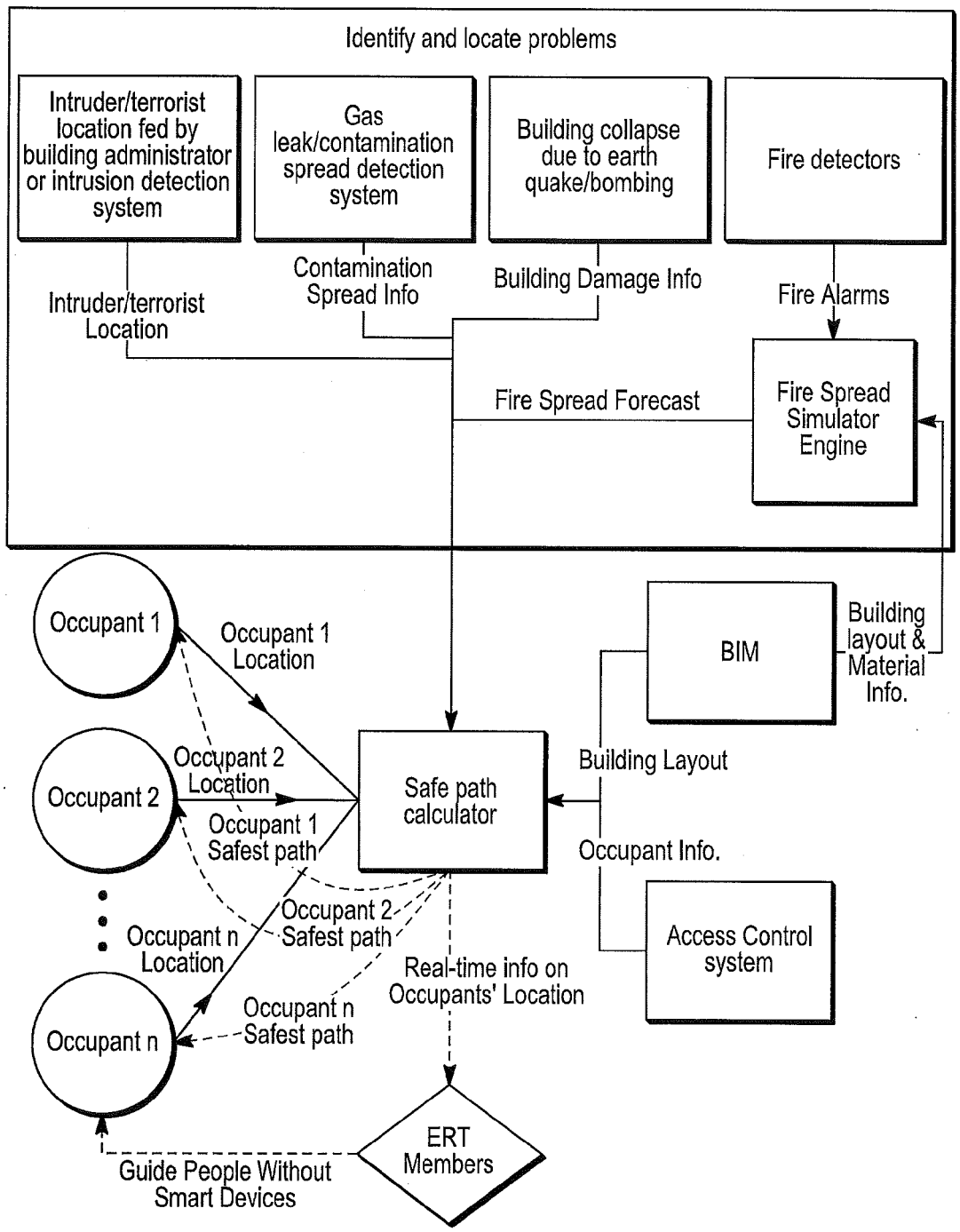
FIG. 2 illustrates a block diagram showing further detail of the system of FIG. 1.

These deficiencies are addressed by the system of FIG. 1. As shown in FIG. 2, the system has five major processing modules, including (1) an identify and locate problems module (referred to above as the threat detection system), (2) the BIM, (3) the access control system, (4) the occupant locator and notifier module, and (5) the safe path calculator. The identify and locate problems module integrates with multiple systems to identify and locate various problems. The identify and locate problems module operates with and receives inputs from fire sensors, seismic sensors, cameras, and external news feeds that provide information on environmental risks, such as storms, floods, or earthquakes.

The identify and locate problems module may include a number of sub-modules. These sub-modules may include, but are not limited to (1) an intruder/terrorist locator module, (2) a gas leak/contamination locator, (3) a building damage locator, and (4) a fire locator with fire spread simulation engine. After identifying and locating a problem, the system notifies the safe path calculator module about the location and type of problem. It also provides a forecast of where the problem will be located (spread to) in a few minutes of time.

The BIM module comprises an interior layout, doors for access into particular areas, material used in construction, plumbing, electrical, and HVAC details, etc. This module integrates with various building management systems to provide a structure of the building along with operating details of such systems. This module provides information to the safe path calculator module for calculating the safest navigation paths based on the building structure. It also provides information to various simulation sub-modules in the identify and locate problems module in order to forecast the spread of detected problems.

The access control module is discussed above in some detail. It can determine in which area the occupants of the building area are currently located based upon their access card swipe data.

The occupant locator and notifier is also discussed above. This module uses triangulation from WiFi routers, iBeacon, etc. to locate people via the signals emitted by their cell phone/wearables (smart watch, fitness band)/laptop, etc. This system also works along with access control system data. This module relies upon information from the various devices that occupants use, like smart phones, wearable devices, and other personal devices. It reports the location of the user inside the building to the safe path calculator module. It also receives notifications from the safe path calculator module to guide the user during emergencies.

The safe path calculator module gets data from other modules, generates individual navigation paths, and sends the paths to each occupant through the occupant locator and notifier module. It also provides statistics to emergency rescue teams and suggests efficient evacuation plans.

The system takes advantage of and offers a number of advantages over the prior art. For example, the use of smart phones and wearables are more and more prevalent in everyday use by building occupants. This solution builds upon this trend to provide increased safety. By quickly responding and individually monitoring/guiding occupants, it adds value to the efficiency of emergency rescue operations.

The system of FIG. 1 has a number of use cases. For example, the system may have great value in the case of an intruder trying to contaminate a building by lowering the oxygen level, introduce anesthetics, tear gas, etc., or disable medical centers, R & D labs, or military installations. The system may alert the occupants when an armed person threatens the occupants of a premise. In the case of a gas leak or contamination, users will be notified about the situation so that they can stay away from the spread of the gas or contamination. In the case of an earthquake or nearby building collapse (physical building damage), the occupants can be alerted using the information capabilities of the system.

Assume a case where there is only one exit that is blocked by fire. Here, the system suggests that the rescue team/occupant take the nearby safest breakable window (derived from the BIM) to escape from a fire.

Figure 3:
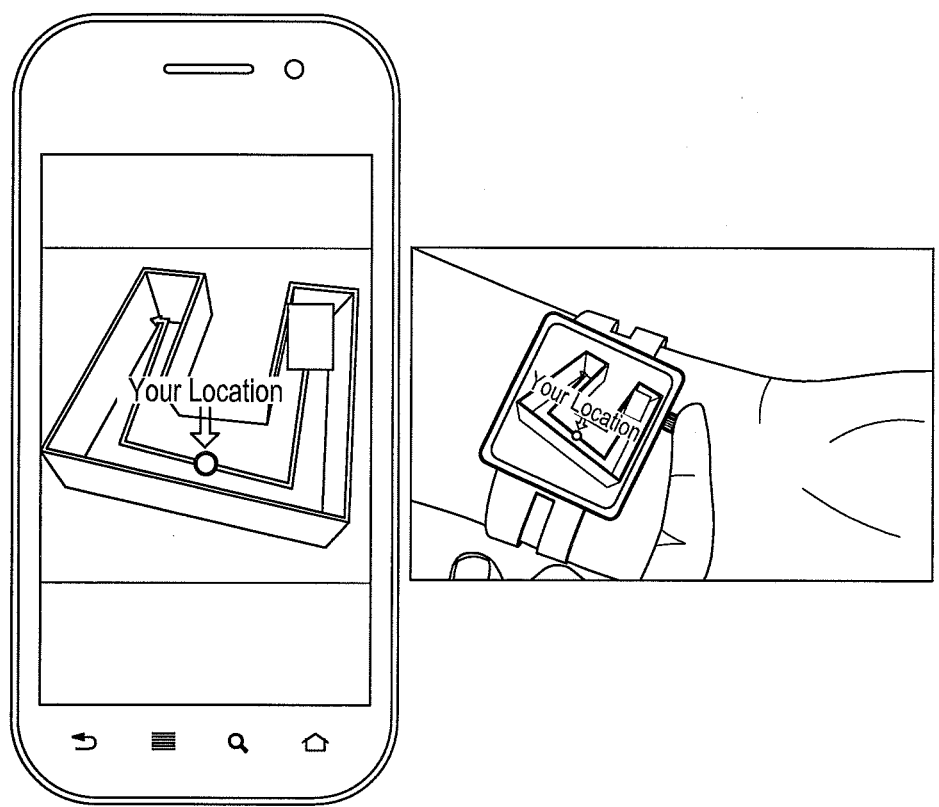
FIG. 3 depicts portable devices that may be used with the system of FIG. 1.

Consider a fire emergency scenario. In case of a fire emergency, the system of FIG. 1 takes input from the fire sensors and locates the fire inside the building. The system predicts a set of fire spread vectors based on building material information from the BIM. The system analyzes these inputs, generates a safe path for each occupant, and suggests routes to a user through his/her smartphone/wearable as shown in FIG. 3. In this scenario, the system utilizes fire spread simulation models, BIM information, and an occupant's coordinates inside a building (obtained from iBeacons/WiFi triangulation techniques smartphone/wearable) to guide the occupants along a safe path away from the fire spread vectors.

The system provides information (i.e., where each person is located, how to reach them safely, etc.) to emergency rescue team members in order to help the occupants. The layout of the building is retrieved from the BIM, and fire spread vectors are calculated by the simulation model and can be used along with access control configuration information to calculate a safe path for the occupant to the exit based on his/her current location inside the building.

In the case of a scenario involving an active shooter, the system provides an interface for an administrator to declare a part of a building as affected by and under control of the shooter. The administrator may use existing video cameras to identify the location of the shooter. Once that part of the building is declared affected, the system collects individual locations of the occupants and decides who is in the direct visibility of the intruder and who is hidden. Then, it sends an escape plan for those who are hidden from the intruder's visibility. The system also alerts the authorities and sends the location of people who may be accessible to the rescue team.

In an industrial gas leak scenario, once the leak is detected by the system, the system calculates how the contamination would spread based on the wind flow direction, chemical contents of the building, and temperature and how that spread could be affected by the surroundings. The occupants can be notified of the direction in which they should move to avoid the gas leak spread zones.

In the case of a building collapse scenario, the occupants inside a building may not be aware of the collapse of a nearby building due to the confusion associated with natural disasters or by other reasons. They may not be aware of the location, direction, and other details of the affected area. Once this information is provided to the system through seismic and other prediction subsystems, the system issues notifications to the occupants so that they may move away from that region.

The system can be used in a number of different environments. The system can be used in large airports, industrial spaces, and commercial buildings. The system supports rescue teams in order to perform their tasks effectively and proficiently. This solution is the most useful and efficient in large industrial areas, multistory commercial/residential buildings, and shopping malls that may require different evacuation plans based on the different areas of the building.

While designing a building, the system can suggest better placement of fire exits by simulating fires originating from various points and analyzing probable escape routes of occupants. The system can still be used to direct people to shelter in case of a hurricane.

In general, the system may include a threat detection system having a plurality of threat sensors, wherein the threat detection system detects a threat and a location of the threat within a secured geographic area, a building information model (BIM) of the secured area embodied in memory, an access control system executing on one or more processors that detect entry by human occupants into the secured area and that provide an overall indication of location of each of the human occupants, an occupant locator and notifier executing on one or more processors that detect a specific location of human occupants within the secured area via radio waves emitted by a wireless device carried by each of the human occupants, and a safe path calculator executing on one or more processors that calculate a respective route to a safe exit for each of the human occupants based upon the BIM, the threat, the location of the threat, and the specific or overall indicated location of the human occupant, wherein the occupant location and notifier wirelessly sends the respective calculated route to the wireless device of the human occupant.

Alternatively, the system may include a security system that protects a secured geographic area of a building, wherein the security system includes one or more processors that detect a threat and a location of the threat within the secured area, a building information model (BIM) of the secured area embodied in memory, an access control system having one or more processors that detect an entry location of human occupants into the secured area, an occupant locator executing on one or more processors that detect a specific location of human occupants within the secured area via radio waves emitted by a wireless device carried by each of the human occupants, a safe path calculator executing on one or more processors that calculate a respective route to a safe exit for each of the human occupants based upon the BIM, the threat, the location of the threat, and the specific or entry location of the human occupant, and a notifier executing on one or more processors that wirelessly send the respective calculated route to the wireless device of the respective human occupants.

Alternatively, the system may include a security system that protects a secured geographic area of a building, wherein the security system includes one or more processors and a plurality of threat sensors that detect threats and locations of threats within the secured area, a building information model (BIM) of the secured area embodied in memory, an access control system having one or more processors that detect an entry location of human occupants into the secured area, an occupant locator executing on one or more processors that detect a specific location of human occupants within the secured area using radio direction finding based upon radio waves emitted by a wireless device carried by each of the human occupants, a safe path calculator executing on one or more processors that calculate a respective route to a safe exit for each of the human occupants based upon the BIM, a detected threat, a location of the detected threat, and the specific or entry location of the human occupant, and a notifier executing on one or more processors that wirelessly send the respective calculated route to the wireless device of the respective human occupants.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A system comprising:
   a threat detection system having a plurality of threat sensors, wherein the threat detection system detects a threat and a location of the threat within a secured geographic area;
   a building information model (BIM) of the secured geographic area embodied in memory;
   an access control system executing on one or more processors that detect entry by human occupants into the secured geographic area and that provide a respective overall indication of location of each of the human occupants, wherein the respective overall indication of location is based on the entry detected;
   an occupant locator and notifier executing on one or more processors that detect a respective specific location of each of the human occupants within the secured geographic area via respective radio waves emitted by a respective wireless device carried by a respective one of the human occupants;
   a safe path calculator executing on one or more processors that calculate a respective route to a safe exit for each of the human occupants based upon the BIM, the threat, the location of the threat, and the respective specific location or the respective overall indication of location of the respective one of the human occupants, wherein the occupant locator and notifier wirelessly sends the respective route calculated to the respective wireless device of the respective one of the human occupants; and
   a processor that searches for the respective specific location for each of the human occupants and, upon failing to detect the respective specific location, uses the respective overall indication of location as a respective starting point of the respective route to the safe exit.

2. The apparatus as in claim 1 wherein the plurality of threat sensors further comprises at least some fire, gas, or contamination detection devices.

3. The apparatus as in claim 2 wherein the location of the threat further comprises an area of a fire, a gas, or a contamination indicated by the at least some fire, gas, or contamination detection devices and a predicted area into which the fire, the gas, or the contamination will spread.

4. The apparatus as in claim 3 further comprising a processor that predicts a spread of the fire, the gas, or the contamination based upon building characteristics and contents of the secured geographic area retrieved from the BIM.

5. The apparatus as in claim 1 wherein the plurality of threat sensors further comprises a seismometer.

6. The apparatus as in claim 1 further comprising a user interface that receives a designation of a portion of the secured geographic area as a high risk area due to a presence of at least a terrorist or a shooter.

7. The apparatus as in claim 1 further comprising a processor that identifies the respective overall indication of location or the respective specific location of each of the human occupants for rescue personnel.

8. The apparatus as in claim 1 wherein the one or more processors of the occupant locator and notifier further comprise a processor that uses triangulation to identify the respective specific location of each of the human occupants.

9. The apparatus as in claim 1 wherein the access control system further comprises at least one card reader.

10. A system comprising:
    a security system that protects a secured geographic area of a building, wherein the security system includes one or more processors that detect a threat and a location of the threat within the secured geographic area;
    a building information model (BIM) of the secured geographic area embodied in memory;
    an access control system having one or more processors that detect a respective entry location of each of human occupants into the secured geographic area;
    an occupant locator executing on one or more processors that detect a respective specific location of each of the human occupants within the secured geographic area via respective radio waves emitted by a respective wireless device carried by a respective one of the human occupants;
    a safe path calculator executing on one or more processors that calculate a respective route to a safe exit for each of the human occupants based upon the BIM, the threat, the location of the threat, and the respective specific location or the respective entry location of the respective one of the human occupants;
    a notifier executing on one or more processors that wirelessly send the respective route calculated to the respective wireless device of the respective one of the human occupants; and
    a processor that searches for the respective specific location for each of the human occupants and, upon failing to detect the respective specific location, uses the respective entry location as a respective starting point of the respective route to the safe exit.

11. The apparatus as in claim 10 further comprising a user interface that receives a designation of a portion of the secured geographic area as a high risk area due to a presence of at least a terrorist or a shooter.

12. The apparatus as in claim 10 further comprising a processor that identifies the respective entry location or the respective specific location of each of the human occupants rescue personnel.

13. The apparatus as in claim 10 wherein the one or more processors of the occupant locator further comprise a processor that uses triangulation to identify the respective specific location of each of the human occupants.

14. The apparatus as in claim 10 wherein the access control system further comprises at least one card reader.

15. The apparatus as in claim 10 wherein the security system further comprises a plurality of threat detectors.

16. The apparatus as in claim 15 wherein the plurality of threat detectors further comprises a seismometer.

17. The apparatus as in claim 15 wherein the plurality of threat detectors further comprises at least some fire, gas, or contamination detection devices.

18. A system comprising:
a security system that protects a secured geographic area of a building, wherein the security system includes one or more processors and a plurality of threat sensors that detect threats and locations of threats within the secured geographic area;
a building information model (BIM) of the secured geographic area embodied in memory;
an access control system having one or more processors that detect a respective entry location of each of human occupants into the secured geographic area;
an occupant locator executing on one or more processors that detect a respective specific location of each of the human occupants within the secured geographic area using radio direction finding based upon respective radio waves emitted by a respective wireless device carried by a respective one of the human occupants;
a safe path calculator executing on one or more processors that calculate a respective route to a safe exit for each of the human occupants based upon the BIM, a detected one of the threats, a location of the detected one of the threats, and the respective specific location or the respective entry location of the respective one of the human occupants;
a notifier executing on one or more processors that wirelessly send the respective route calculated to the respective wireless device of the respective one of the human occupants; and
a processor that searches for the respective specific location for each of the human occupants and, upon failing to detect the respective specific location, uses the respective entry location as a respective starting point of the respective route to the safe exit.

* * * * *